United States Patent
Carroll

(10) Patent No.: US 8,467,079 B2
(45) Date of Patent: Jun. 18, 2013

(54) SYSTEM AND METHOD FOR LOCATION BASED PRINTING FOR HEALTHCARE DATA

(75) Inventor: Alexander Carroll, Bainbridge Island, WA (US)

(73) Assignee: General Electric Company, Schenectady, NY (US)

( * ) Notice: Subject to any disclaimer, the term of this patent is extended or adjusted under 35 U.S.C. 154(b) by 1167 days.

(21) Appl. No.: 12/180,135

(22) Filed: Jul. 25, 2008

(65) Prior Publication Data

US 2010/0020349 A1 Jan. 28, 2010

(51) Int. Cl.
*G06F 3/12* (2006.01)
*H04W 24/00* (2009.01)

(52) U.S. Cl.
USPC ....... 358/1.15; 358/1.13; 358/1.14; 455/41.3; 455/456.1; 455/456.2; 455/456.3

(58) Field of Classification Search
USPC .................................. 358/1.13–1.15; 455/404
See application file for complete search history.

(56) References Cited

U.S. PATENT DOCUMENTS

| | | | | |
|---|---|---|---|---|
| 7,099,031 B2* | 8/2006 | Ogura et al. | ................. | 358/1.15 |
| 7,352,865 B2* | 4/2008 | Gassho et al. | ................. | 380/258 |
| 7,818,285 B1* | 10/2010 | Klatt et al. | .................... | 707/600 |
| 8,139,243 B2* | 3/2012 | Isshiki et al. | ................. | 358/1.15 |
| 2003/0055839 A1* | 3/2003 | Klatt et al. | ................. | 707/104.1 |
| 2003/0197887 A1* | 10/2003 | Shenoy et al. | ............... | 358/1.15 |
| 2004/0187022 A1* | 9/2004 | Asada et al. | .................. | 713/200 |
| 2004/0218201 A1* | 11/2004 | Lermant et al. | .............. | 358/1.13 |
| 2005/0136949 A1* | 6/2005 | Barnes, Jr. | .................... | 455/461 |
| 2005/0174609 A1* | 8/2005 | Thurlow | ....................... | 358/425 |
| 2006/0044598 A1* | 3/2006 | Etelapera | ..................... | 358/1.15 |
| 2009/0150174 A1* | 6/2009 | Buck et al. | ........................ | 705/2 |

* cited by examiner

*Primary Examiner* — Twyler Haskins
*Assistant Examiner* — Dennis Dicker
(74) *Attorney, Agent, or Firm* — Hanley, Flight and Zimmerman, LLC

(57) ABSTRACT

A printing system for printing health care data is provided. The printing system includes a processor operably connected to a user device and to a plurality of printers that is configured to associate a location with the user device, and to select at least one printer from among the plurality of printers to provide a print out requested from the user device based on the location associated with the user device.

20 Claims, 2 Drawing Sheets

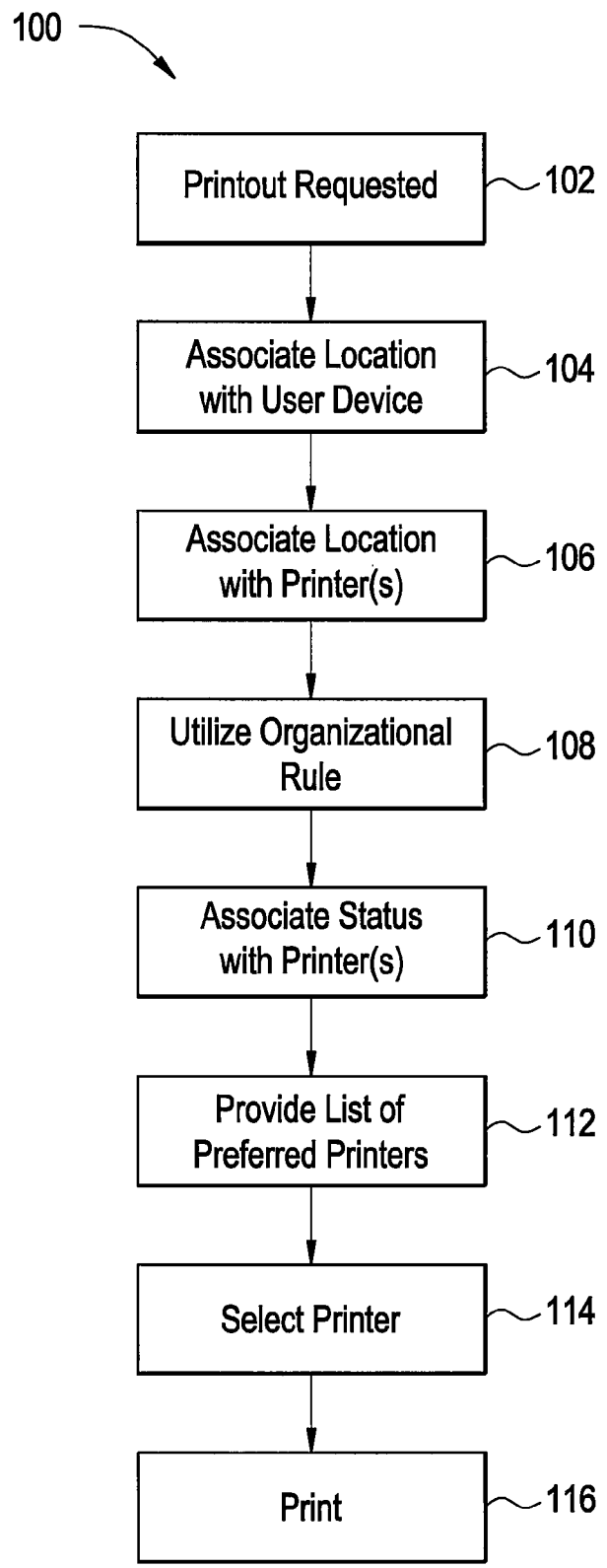

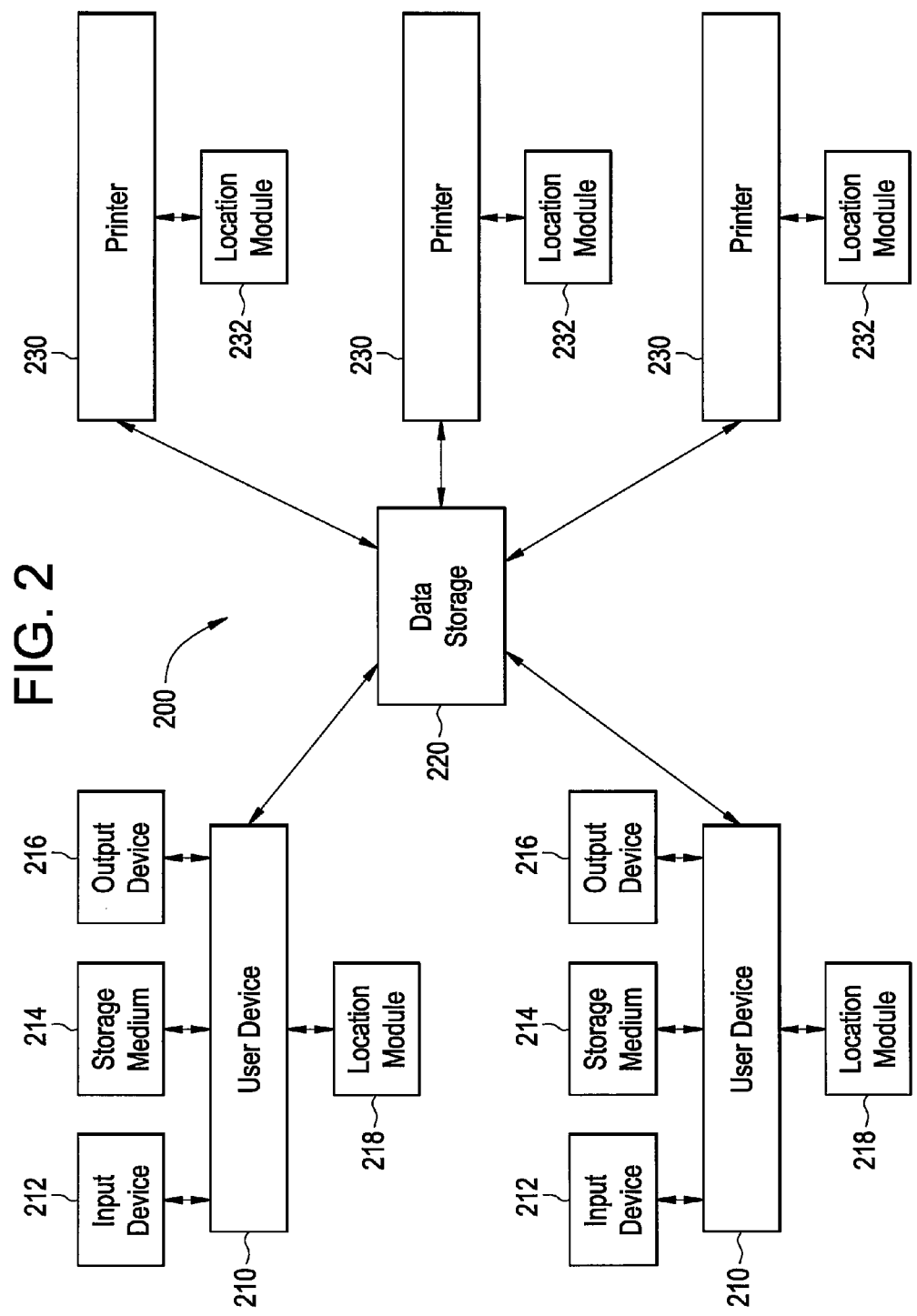

SYSTEM AND METHOD FOR LOCATION BASED PRINTING FOR HEALTHCARE DATA

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Healthcare workers, such as doctors, nurses, and technicians, often use computers and/or mobile devices in the course of providing care to patients. Frequently, healthcare providers must print out a hard copy of data available to them on computers and/or mobile devices. Currently, a list of printers accessible from a given device can be either manually configured, or managed through naming conventions.

Healthcare organizations, such as hospitals and clinics, are frequently fairly large, and can have a substantial number of printers located at different locations. When healthcare workers desire to obtain a print out while using a computer and/or mobile device, they may be located a considerable distance from printers accessible from that device that have been manually configured or managed through a naming convention. Thus, a healthcare worker may only be able to obtain a printout from a given device on a printer (or printers) that are not close to the physical location of the healthcare worker using that device, and unable to obtain a printout from a printer (or printers) that are closer but not accessible from the device being used through its manual configuration, or management through naming conventions. Further, a healthcare worker may not be able to identify printers that may be accessible and closer, or be able to discern which available printers may actually be closest.

Healthcare organizations are subject to privacy laws and organizational policies as well. As one example, the Health Insurance Portability and Accountability Act (HIPAA) establishes regulations regarding use and disclosure of health-related information. Certain information available on a healthcare organization's computer systems may be limited to being printed out at certain predetermined, secure locations for privacy or security reasons. A healthcare organization may risk running afoul of privacy laws and/or organizational policies if a healthcare worker were to print such information out at an unapproved or unsecure location.

Additional factors may render certain printers unavailable or less desirable for use. For example, a printer may be out of paper, have a paper jam, or have some other mechanical issue which prevents it from functioning properly. Further, a printer may have another issue, such as a long queue, that makes it less desirable to use.

BRIEF SUMMARY OF THE INVENTION

Certain embodiments of the present invention provide methods and systems for location and/or rules based printing for healthcare data.

Certain embodiments provide a printing system for printing health care data. The printing system includes a user device and a plurality of printers. The printing system further includes a processor, operably connected to the user device and to the plurality of printers, that is configured to associate a location with the user device, and to select at least one printer from among the plurality of printers to provide a print out requested from the user device based on the location associated with the user device.

Certain embodiments provide a method for location based printing for healthcare data. The method includes associating first location information with a user device. The method further includes associating second location information with at least one of a plurality of printers. The method further includes selecting at least one printer from the plurality of printers to provide a printout requested from the user device based on the first location information and the second location information.

Certain embodiments provide a computer-readable storage medium including a set of instructions for execution on a processing device and associated processing logic. The set of instructions include an input routine that allows location information of a user device to be input. The set of instructions further includes a processing routine configured to select at least one printer from a plurality of printers to provide a printout requested from the user device based on the location information of the user device and on location information of at least one printer of the plurality of printers.

BRIEF DESCRIPTION OF SEVERAL VIEWS OF THE DRAWINGS

FIG. 1 shows a flow diagram for a method 100 for selecting a printer to provide a printout requested from a user device according to an embodiment of the present invention.

FIG. 2 illustrates a printing system 200 in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Certain aspects of the present invention provide an automated method of selecting an appropriate printer, based on, for example, a user's location, and/or the type of data being printed out, and/or a status of the printer.

FIG. 1 shows a flow diagram for a method 100 for selecting a printer to provide a printout requested from a user device according to an embodiment of the present invention.

At step 102, a request for a printout is sent from a user device. Examples of user devices include computer workstations, laptop computers and/or electronic notebooks, clinical workstations (including personal computers mounted on carts for portability through a healthcare facility), nursing station terminals, mobile telephones, and personal digital assistants (PDA's). In certain embodiments, the user device may be a mobile terminal being used by a healthcare worker moving through various locations in a healthcare facility. As one example, the mobile terminal may be a clinical workstation being used by a healthcare worker as the healthcare worker moves between various locations in a healthcare facility. As another example, the mobile terminal may be a laptop computer used by a healthcare worker at various locations throughout a healthcare facility, and/or at separate related healthcare facilities. In certain embodiments, the request is sent by the user of the user device, and may include a request by the user to print data being displayed on a screen of the user device and/or data from a file or files accessible by the user device, including, for example, databases. In certain embodiments, the user device may be configured to automatically request a printout as part of the performance of a standard procedure.

At step 104, location information is associated with the user device. For example, in certain embodiments, the user device may be a workstation with a location hard-coded to a computer system. In certain embodiments, the user device may prompt a user to provide the user's location when the user requests a printout. In certain embodiments, the user device may automatically provide information concerning its location. For example, information concerning the location of the user device may be obtained through techniques and related equipment associated with radio frequency (RF) fingerprinting, Wi-Fi (including identification of Wi-Fi hotspot in use), Global Positioning System (GPS), differential GPS, radio-frequency identification (RFID), or other methods of implementation of Real Time Location Systems (RTLS). In certain embodiments, identification of the user of the user device and identification of recent security checkpoints passed by the user (for example, a user may scan an identification card to access various locations in a healthcare facility) may provide information concerning the location of the user device.

At step 106, location information is associated with at least one of a plurality of printers. For example, a healthcare organization typically can contain a significant number of printers (in some cases, in the hundreds). In certain embodiments, a number of printers will have generally fixed locations, and may have their location information hard wired to a central computer system with which a user device is in communication with. As another example, in certain embodiments, a number of printers may also provide information concerning their location using similar techniques as mentioned above (for example, RF fingerprinting). In certain embodiments, a combination of techniques for associating location information with printers may be used. By way of example, in certain embodiments one group of printers may have their location hard-wired to a central computer system, and another group of printers may provide location information via RF fingerprinting.

At step 108, an organizational rule is utilized to associate available printers with the data that is being requested to be printed out. For example, healthcare providers often deal with patient records that have increased concerns regarding privacy and/or security. These patient records that have increased privacy and/or security concerns are then restricted in that they are allowed only to be printed out in specified, secure locations. As an example, certain health conditions, such as HIV/AIDS status are subject to heightened security levels. As an additional example, if a patient is also an employee of the healthcare facility, information related to such employee patients can be subject to heightened security levels. Additionally, information related to celebrity or "VIP" patients may be subject to heightened security levels. In certain embodiments, flags are placed on types of data which may be printed only at specified locations. Further, printing assets are also tagged based on what categories of data may be printed out by a particular printing asset. This information may then be used to associate available printers with the data to be printed out, and prevent certain information from being printed out at inappropriate locations. In certain embodiments, when data requested to be printed out is of a sensitive nature, all printers that are not tagged as permissible for that particular type of data are eliminated from a list of available printers that may be provided to the user device. As an alternative, in certain embodiments, only printers that are tagged as permissible for a particular type of data are allowed to be used in constructing a list of available printers when a printout is requested for that particular type of data.

At step 110, a status is associated with at least one printer at a healthcare facility. The status may relate to the availability and/or convenience of a printer. For example, a printer may be functioning properly and have an available status As another example, the status of a printer may be unavailable due to a mechanical problem with that printer. The status may also relate to the convenience of using a particular printer. As one example, a printer may be out of paper. As an additional example, a printer may be configured for color printing and/or a different size or type of paper than is appropriate for the requested printout, which may present an unnecessary additional cost and/or inconvenience in some circumstances. As still a further example, a printer may have a long queue of print jobs to be performed which may result in additional waiting time.

At step 112, a list of preferred printers is provided to the user device. In certain embodiments, the list of preferred printers is displayed on a screen of the user device. In certain embodiments, the list of preferred printers is determined based on the locations of the user device and printers, the organizational rules regarding which types of data may be printed at which printers, and the status of the printers. For example, the user device may display a predetermined number of preferred printers eligible under organizational rules for the particular type of data being printed and having an available status, in an order determined by their proximity to the user device, with the closest eligible printer listed first. In certain embodiments, a status of the printers may be displayed. For example, the displayed list of printers may also contain information regarding whether a given printer is out of paper, a color printer, and/or has a long queue of print jobs to be printed out.

At step 114, a printer is selected. In certain embodiments, for example, step 112 may be omitted, and the closest available printer automatically selected. In certain embodiments, for example, step 112 may be omitted, and a message indicating the closest available printer may be sent to the user device, and the user device may prompt the user to either approve printing at the closest printer, or request an alternate printer. In certain embodiments, a user may select a printer from the list of preferred printers provided in step 112. For example, users may find it more convenient to print to a printer that is farther away from their current location, if it is located in an area to which they will soon be going, or on the way to such an area. Further, a user may select a printer based on the status of a printer, such as selecting a slightly more distant printer if the nearest printer has a long queue of print jobs waiting to be performed. In certain embodiments, if no printer is available for the requested printout and/or any available printer or printers is farther than a predetermined distance from the location of the user device, a message may be sent to the user device and displayed to the user indicating that no printer is available and/or any available printer or printers is farther than a predetermined distance away.

At step 116, the requested information is printed out to the selected printer. In certain embodiments, a confirmation message is sent to the user device indicating that the information has been sent to the selected printer for printing out. In certain embodiments, the confirmation message may include the location of the selected printer and/or information relating to a status of the printer (such as, for example, if the printer has a long queue).

One or more of the steps of the method 100 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps, and/or perform the steps in a different order than the order listed, and/or combine certain of the steps listed above. For example, some steps may not be performed in certain embodiments of the present invention. As a further example, certain steps may be performed in a different temporal order, including simultaneously, than listed above.

FIG. 2 illustrates a printing system 200 in accordance with an embodiment of the present invention. Certain embodiments of the printer selection described above may be implemented in a printing system, such as the system 200 of FIG. 2. In certain embodiments, an appropriate printer or printers may be selected using a system such as printing system 200 including at least one user device 210, at least one data storage 220, and at least one printer 230. For example, while two user devices 210 are illustrated in system 200, a larger or smaller number of workstations 210 can be used in accordance with embodiments of the presently described technology. In addition, while one data storage 220 is illustrated in system 200, system 200 can include more than one data storage 220. For example, each of a plurality of entities (such as remote data storage facilities, hospitals or clinics) can each include one or more data stores 220 in communication with one or more user devices 210. Further, while three printers 230 are illustrated in system 200, system 200 can include a larger or smaller number of printers 230. In certain embodiments, the printing system 200 is part of and/or used in conjunction with a larger clinical information system which may include, for example, hospital information systems (HIS), radiology information systems (RIS), clinical information systems (CIS), and cardiovascular information systems (CVIS), and storage systems, such as picture archiving and communication systems (PACS), library information systems (LIS), and electronic medical records (EMR).

As illustrated in system 200, one or more user device 210 can be in communication with at least one printer 230 and/or at least one data storage 220. User devices 210 can be connected to and communicate via one or more networks.

User devices 210 and/or printers 230 can be directly attached to one or more data stores 220 and/or communicate with data storage 220 via one or more networks. For example, each user device 210 can be implemented using a specialized or general-purpose computer executing a computer program for carrying out the processes described herein. User devices 210 can be personal computers or host attached terminals, for example. Further, user devices 210 may also be mobile terminals being used by healthcare workers moving through various locations in a healthcare facility. For example, user devices 210 may be laptop computers and/or electronic notebooks, clinical workstations (including personal computers mounted on carts for portability through a healthcare facility), nursing station terminals, mobile telephones, and/or personal digital assistants (PDA's). If user devices 210 are personal computers, the processing described herein can be shared by one or more data stores 220 and a user device 210 by providing an applet to user device 210, for example.

In certain embodiments, user devices 210 include an input device 212, an output device 216 and a storage medium 214. For example, user devices 210 can include a mouse, stylus, touch pad, microphone and/or keyboard as an input device. In certain embodiments, a user device 210 or a component thereof may comprise an input module configured to input location information to be associated with the user device 210. As an example, a user may utilize a keyboard at a user device 210 to input a location corresponding to the user's current location and/or a preferred location to retrieve a printout.

User devices 210 can include a computer monitor, liquid crystal display ("LCD") screen, and/or speaker as an output device. In certain embodiments, a user device 210 or a component thereof may comprise a display module configured to display a list of available printers. As an example, the output device 216 of the user device 210 may comprise a display screen that displays a list of available printers, along with the location of the printers, and the status of the printers.

In certain embodiments, user devices 210 comprise an input module comprising a user interface. In certain embodiments, the user interface is configured to allow a user an option to select among a group of identified available printers to input a printer to be used for providing a requested printout. For example, a user may view a list of available printers on a display screen, along with their locations and scroll through the selections to identify a specific printer to perform the printout. The display screen may also display a message confirming that a print request has been sent and/or successfully performed.

Storage medium 214 of user devices 210 is, for example, a computer-readable memory. For example, storage medium 214 can include a computer hard drive, a compact disc ("CD") drive, a USB thumb drive, or any other type of memory capable of storing one or more computer software applications. Storage medium 214 can be included in user devices 210 or physically remote from user devices 210. For example, storage medium 214 can be accessible by user devices 210 through a wired or wireless network connection.

Storage medium 214 includes a set of instructions for a computer. The set of instructions includes one or more routines capable of being run or performed by user devices 210. The set of instructions can be embodied in one or more software applications or in computer code.

In certain embodiments, the user device 210 includes a location module 218. For example, in certain embodiments, the location module 218 includes a routine that prompts a user to identify their current location in response to a request from the user for a print out. In certain embodiments, the location module 218 includes equipment to be used in connection with systems utilizing RF fingerprinting, Wi-Fi (including identification of Wi-Fi hotspots), Global Positioning System (GPS), differential GPS, radio-frequency identification (RFID), or other methods of implementation of Real Time Location Systems (RTLS) to associate a location with the user device.

The printers 230 may include a variety of printers. For example, printers may be configured to print on different sizes or types of papers. Additionally, for example, various printers may be portable, while other printers will have generally fixed locations. In certain embodiments, a number of printers will have generally fixed locations, and may have their location information hard wired to a central computer system with which a user device is in communication. In certain embodiments, a number of printers of printers 230 may include a location module 232. In certain embodiments, the location module 232 includes equipment to be used in connection with systems utilizing RF fingerprinting, Wi-Fi (including identification of Wi-Fi hotspots), Global Positioning System (GPS), differential GPS, or other methods of implementation of Real Time Location Systems (RTLS) to associate a location with the printer. In certain embodiments, a combination of techniques for associating location information with printers may be used. In certain embodiments, a combination of generally fixed and permanent printers may be used, and a combination and/or mixture of techniques for associating locations with the printers may also be employed.

In certain embodiments, the printers 230 are subject to an organizational rule or rules utilized to associate available printers with the data that is being requested to be printed out. For example, a group of certain printers may be restricted from printing out information relating to patient records that have increased concerns regarding privacy and/or security. Such patient records may be allowed only to be printed out in specified, secure locations. As examples, certain health conditions (such as HIV/AIDS status), or employment status (for example, if a patient is also an employee of the healthcare facility), or another status of a patient (such as celebrity or "VIP" patients) may subject records-relating to that patient and/or a-procedure to heightened-security levels. In certain embodiments, for example, flags are placed on types of data which may be printed only at specified locations. Further, individual printers 230 are also tagged based on what categories of data may be printed out by that particular printer 230. This information may then be used to associate available printers with the data to be printed out, and prevent certain information from being printed out at inappropriate locations. In certain embodiments, when data requested to be printed out is of a sensitive nature, all printers that are not tagged as permissible for that particular type of data are eliminated from a list of available printers that may be provided to the user device via a processor operably connected to the printers 230 and user device 210. As an alternative, in certain embodiments, only printers that are tagged as permissible for a particular type of data are allowed to be used in constructing a list of available printers when a printout is requested for that particular type of data.

In certain embodiments, a status is associated with the printers 230 at a healthcare facility. The status may relate to the availability and/or convenience of a printer 230. For example, the status of a printer may be unavailable due to a mechanical problem with that printer. The status may also relate to the convenience of using a particular printer. As one example, a printer may be out of paper. As an additional example, a printer may be configured for color printing and/or a different size or type of paper than is appropriate for the requested printout, which may present an unnecessary additional cost and/or inconvenience in some circumstances. As still a further example, a printer may have a long queue of print jobs to be performed which may result in additional waiting time.

Data storage 220 can be implemented using a variety of devices for storing electronic information such as a relational database system and/or a file transfer protocol ("FTP") server, for example. Data storage 220 includes electronic data. For example, data storage 220 can store patient exam images and/or other information, electronic medical records, patient orders, etc., for a plurality of patients. As an additional example, data storage 220 may include a policy service and a printer service. Data storage 220 may include and/or be in communication with one or more clinical information systems, for example. In certain embodiments, data storage 220 comprises a processor configured to associate location-information with a user device 210 and printer(s) 230, and to select at least one printer to provide a print out based on the location associated with the user device, in response to a request for a printout from the user device. For example, in certain embodiments, data storage 220 comprises a processor configured to identify available printers based on an organizational rule corresponding the data to be printed out, provide a user with a list of preferred printers based on the location information associated with the user device, and provide a user with an option to select from among the list of preferred printers.

Communication between user devices 210 and/or printers 230 and/or data storage 220 can be via any one or more types of known networks including a local area network ("LAN"), a wide area network ("WAN"), an intranet, or a global network (for example, Internet). For example, any two of user devices 210 and data stores 220 can be coupled to one another through multiple networks (for example, intranet and Internet) so that not all components of system 200 are required to be coupled to one another through the same network.

Any user devices 210 and/or data stores 220 and/or printers 230 can be connected to a network or one another in a wired or wireless fashion. In an example embodiment, user devices 210 and data store 220 communicate via the Internet and each user device 210 executes a user interface application to directly connect to data store 220. In another embodiment, user device 210 can execute a web browser to contact data store 220. Alternatively, user device 210 can be implemented using a device programmed primarily for accessing data store 220.

Data storage 220 can be implemented using a server operating in response to a computer program stored in a storage medium accessible by the server. Data storage 220 can operate as a network server (often referred to as a web server) to communicate with user devices 210. Data storage 220 can handle sending and receiving information to and from user devices 210 and can perform associated tasks. Data storage 220 can also include a firewall to prevent unauthorized access and enforce any limitations on authorized access. For instance, an administrator can have access to the entire system and have authority to modify portions of system 200 and a staff member can only have access to view a subset of the data stored at data store 220. In an example embodiment, the administrator has the ability to add new users, delete users and edit user privileges. The firewall can be implemented using conventional hardware and/or software.

Data store 220 can also operate as an application server. Data store 220 can execute one or more application programs to provide access to the data repository located on data store 220. Processing can be shared by data store 220 and user devices 210 by providing an application (for example, a java applet). Alternatively, data store 220 can include a stand-alone software application for performing a portion of the processing described herein. It is to be understood that separate servers may be used to implement the network server functions and the application server functions. Alternatively, the network server, firewall and the application server can be implemented by a single server executing computer programs to perform the requisite functions.

The storage device located at data storage 220 can be implemented using a variety of devices for storing electronic information such as an FTP server. It is understood that the storage device can be implemented using memory contained in data store 220 or it may be a separate physical device. The storage device can include a variety of information including a data warehouse containing data such as patient medical data, for example.

Data storage 220 can also operate as a database server and coordinate access to application data including data stored on the storage device. Data storage 220 can be physically stored as a single database with access restricted based on user characteristics or it can be physically stored in a variety of databases.

In an embodiment, data storage 220 is configured to store data that is recorded with or associated with a time and/or date stamp. For example, a data entry can be stored in data storage 220 along with a time and/or date at which the data was entered or recorded initially or at data storage 220. The time/date information can be recorded along with the data as, for example, metadata. Alternatively, the time/date information can be recorded in the data in manner similar to the remainder of the data. In another alternative, the time/date information can be stored in a relational database or table and associated with the data via the database or table.

In an embodiment, data storage 220 is configured to store image and/or other medical data for a patient. The medical data can include data such as numbers and text. The medical data can also include information describing medical events. For example, the medical data/events can include a name of a medical test performed on a patient. The medical data/events can also include the result(s) of a medical test performed on a patient. For example, the actual numerical result of a medical test can be stored as a result of a medical test. In another example, the result of a medical test can include a finding or analysis by a caregiver that entered as text.

A user using certain embodiments of a printing system described herein could input a location associated with a user device from which a print out is being requested, and a processor would automatically select at least one printer based on the location associated with the user device. Further, in certain embodiments, the processor could automatically select at least one printer further based on an organizational rule corresponding to the data to be printed out. As just one example of the use of certain embodiments of a printing system, a user using a user device could request a printout of information pertaining to a medical record for a patient who was also an employee of the health care facility. A location could be associated with the user device, for example, by RF fingerprinting. Based on the location associated with the user device, the processor could generate a list of printers located near the location associated with the user device. Further, the processor could eliminate from that list any printers in locations not approved for printing out such information. Then, the processor could provide the list of printers to the user device, where the list would be displayed on a screen to the user. The user device could also display which printers were, for example, out of paper, or experiencing a long queue. Next, the user could select from the list of printers a specific printer best suited for the user, and the print job sent to that particular printer, from where the user could pick it up.

Thus, certain embodiments provide a technical effect of automatically selecting at least one printer based on location information associated with a user device requesting a printout. Certain embodiments provide a technical effect of automatically selecting at least one printer based on location information associated with a user device requesting a printout as well as based on at least one organizational rule associated with the data for which the printout was requested. Certain embodiments provide a technical effect of making the selection of an appropriate printer faster and/or more convenient and/or more efficient for health care workers. Certain embodiments provide a technical effect of making the selection of an appropriate printer for information subject to heightened security standards more secure. Certain embodiments provide a technical effect of providing time savings for healthcare workers and IT administrators by automating selection of an appropriate printer.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

For example, certain embodiments provide a computer-readable storage medium including a set of instructions for execution on a processing device and associated processing logic. The set of instructions include an input routine that allows location information of a user device to be input. The set of instructions also include a processing routine configured to select at least one printer from a plurality of printers to provide a printout requested from the user device based on the location information of the user device and on location information of at least one printer of the plurality of printers. In certain embodiments, the processing routine is further configured to select at least one printer from the plurality of printers to provide a printout based on an organization rule corresponding to the data to be printed out. In certain embodiments, the processor is further configured to select at least one printer from the plurality of printers to provide a printout requested from the user device based on a status condition of at least one of the plurality of printers. In certain embodiments, the processor is configured to provide a list of preferred printers from the plurality of printers, and to provide a user of the user device with an option to select among the list of preferred printers. Further, in certain embodiments, the processor is further configured to provide the user device with at least one of location information associated with the list of preferred printers and status information associated with the list of preferred printers.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory-storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A printing system for printing healthcare data, said printing system comprising:
 a processor operably connected to a user device and to a plurality of printers, said processor configured to associate a location with said user device, said processor configured to select at least one printer from among said plurality of printers to provide a print out requested from said user device based on said location associated with said user device, wherein at least one of said plurality of printers is tagged as permissible for use with data of a type of sensitive nature and at least one of said plurality of printers is not tagged as permissible, and said at least one printer selected to provide said printout is selected from said at least one of said plurality of printers tagged as permissible when said print out requested includes data of said type of sensitive nature.

2. The printing system of claim 1, wherein said user device comprises a mobile terminal comprising a location module, and said processor utilizes said location module to associate said location with said mobile terminal.

3. The printing system of claim 1, wherein said processor is configured to select among said plurality of printers to provide a print out requested from said user device based on an organizational rule corresponding to the data to be printed out.

4. The printing system of claim 3, wherein said organizational rule pertains to the privacy of a health condition.

5. The printing system of claim 3, wherein said organizational rule pertains to the privacy of an employment status.

6. The printing system of claim 1, wherein said at least one printer selected from said plurality of printers comprises a plurality of preferred printers, and said processor is configured to provide a user with an option to select from among said plurality of preferred printers.

7. A method for location based printing for healthcare data, said method comprising:
 associating first location information with a user device;
 associating second location information with at least one of a plurality of printers; and
 selecting at least one printer from said plurality of printers to provide a printout requested from said user device based on said first location information and said second location information, wherein at least one of said plurality of printers is tagged as permissible for use with data of a type of sensitive nature and at least one of said plurality of printers is not tagged as permissible, and said selecting at least one printer includes selecting at least one printer from said at least one of said plurality of printers tagged as permissible when said print out requested includes data of said type of sensitive nature.

8. The method of claim 7 wherein said selecting at least one printer from said plurality of printers to provide a printout requested from said user device is based on an organizational rule corresponding to the data to be printed out.

9. The method of claim 8 wherein said organizational rule pertains to the privacy of a health condition.

10. The method of claim 8 wherein said organizational rule pertains to the privacy of an employment status.

11. The method of claim 7 wherein said selecting at least one printer from said plurality of printers to provide a printout requested from said user device is based on a status condition of at least one of said plurality of printers.

12. The method of claim 7 wherein said selecting of at least one printer from said plurality of printers to provide a printout requested from said user device comprises providing a list of preferred printers from said plurality of printers, and providing a user of said user device with an option to select among said list of preferred printers.

13. The method of claim 12 wherein said providing a user of said user device with an option to select among said list of preferred printers comprises providing at least one of location information associated with said list of preferred printers and status information associated with said list of preferred printers.

14. A non-transitory computer-readable storage medium including a set of instructions for execution on a processing device and associated processing logic, the set of instructions comprising:
 an input routine that allows location information of a user device to be input; and
 a processing routine configured to select at least one printer from a plurality of printers to provide a printout requested from said user device based on said location information of said user device and on location information of at least one printer of said plurality of printers, wherein at least one of said plurality of printers is tagged as permissible for use with data of a type of sensitive nature and at least one of said plurality of printers is not tagged as permissible, and said at least one printer selected to provide said printout is selected from said at least one of said plurality of printers tagged as permissible when said print out requested includes data of said type of sensitive nature.

15. The non-transitory computer-readable medium of claim 14, wherein said processing routine is configured to select said at least one printer from said plurality of printers to provide a printout requested from said user device based on an organizational rule corresponding to the data to be printed out.

16. The non-transitory computer-readable medium of claim 15 wherein said organizational rule pertains to the privacy of a health condition.

17. The non-transitory computer-readable medium of claim 15 wherein said organization rule pertains to the privacy of an employment status.

18. The non-transitory computer-readable medium of claim 14 wherein said processor is configured to select said at least one printer from said plurality of printers to provide a printout requested from said user device based on a status condition of at least one of said plurality of printers.

19. The non-transitory computer-readable medium of claim 14 where said processor is configured to provide a list of preferred printers from said plurality of printers, and to provide a user of said user device with an option to select among said list of preferred printers.

20. The non-transitory computer-readable medium of claim 19 where said processor is configured to provide said user device with at least one of location information associated with said list of preferred printers and status information associated with said list of preferred printers.

* * * * *